May 26, 1942.   J. D. McKIERNAN   2,284,005
GAS CUTTING APPARATUS
Filed May 1, 1940

INVENTOR.
James D. McKiernan
BY J. F. Brandenburg
ATTORNEY.

Patented May 26, 1942

2,284,005

UNITED STATES PATENT OFFICE 2,284,005

GAS CUTTING APPARATUS

James D. McKiernan, Brooklyn, N. Y., assignor to Air Reduction Company, Incorporated, New York, N. Y., a corporation of New York Application May 1, 1940, Serial No. 332,654

8 Claims. (Cl. 266—23)

This invention relates to gas cutting apparatus and especially to the control of the operation of one or more cutting torches of such apparatus. The invention can be used with welding torches, but its advantages are more fully realized in the cutting art where gas control requirements are more difficult.

With oxygen cutting torches of the three-hose type there are three separate gas supply lines that must be controlled by valves, and if the torch has a pilot light there is a fourth gas supply that may be valve controlled. With universal cutting machines, and especially those of the folding parallelogram type which have the torch and follower device longitudinally spaced, valve control mechanism accessible to an attendant standing near the torch may be inaccessible to the attendant when he is operating a tracer or other follower device.

It is an object of this invention to provide improved cutting apparatus which has more convenient and more effective control of the gas supply to the torch or torches. Another object of the invention is to provide improved means for controlling a number of different gas supply valves in a predetermined sequence which makes the cutting apparatus efficient and avoids flashbacks when lighting the preheating flames.

A more particular object of the invention is to provide improved gas control means for a universal cutting machine of the folding parallelogram type. In accordance with one feature of the invention the gas control valves are located on the frame of the machine and operated by cams on a shaft, the opposite ends of which are accessible from opposite sides of the machine so that an attendant standing near either the torch or tracer can conveniently control the gas supply.

Other objects, features and advantages of the invention will appear or be pointed out as the specification proceeds.

In the accompanying drawing, forming a part hereof:

Figures 1, 2, 3, 4:
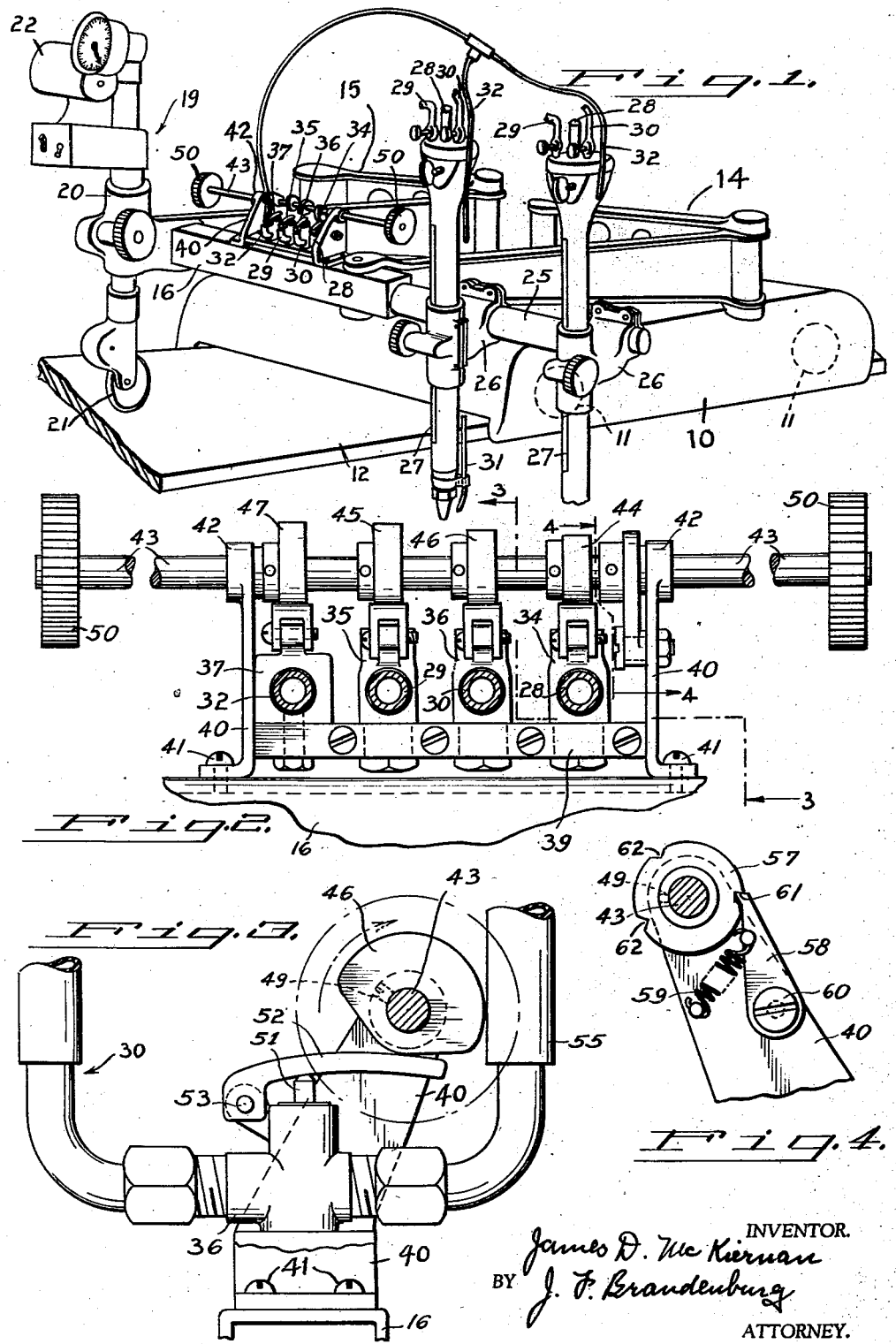
Fig. 1 is a perspective view, partly broken away, showing a universal cutting machine embodying the invention.
Fig. 2 is an enlarged front elevation of the valves and valve-operating means shown in Fig. 1.

Figs. 3 and 4 are enlarged sectional views taken on the lines 3—3 and 4—4, respectively, of Fig. 2.

A movable base or carriage 10 has four flanged wheels 11 that run on the edges of a pattern table 12. Two jointed arms 14 and 15 are supported by parallel posts extending upward from the carriage 10. The rearward links are held parallel to one another by a chain and sprocket connection within the carriage body, but can be held parallel by a connecting link or any of the other expedients that have been used for maintaining the rearward links parallel in machines of the folding parallelogram type.

The forward links of the jointed arms 14 and 15 are connected by a front bar 16 that is fastened to the forward ends of jointed arms by pivot connections. The front bar 16 is parallel to the pattern table and has universal movement in a plane. All positions of the front bar are parallel with one another so that a device connected with the front bar at any point will move along the same path as a device attached to some other part of the front bar.

A tracer 19 is held in a bracket 20 attached to the front bar 16. The tracer 19 has a limited vertical movement in the bracket 20 and has a traction wheel 21 that rests on the pattern table 12. The traction wheel 21 is driven by a motor 22, and the tracer can be turned about a vertical axis to cause the tracer wheel to follow the outline of a drawing or pattern in any and changing directions. The tracer 19, which is merely representative of follower devices for guiding a cutting machine in accordance with a predetermined outline, operates over the pattern table 12 which covers the area between the paths followed by the carriage wheels 11.

An extension 25 at one end of the front bar 16 supports one or more torch holders 26, there being two shown in the drawing, and these torch holders are rigidly secured to the extension 25 of the front bar so that they move along courses similar to that followed by the tracer. There is a cutting torch 27 in each of the torch holders 26 and these torches move over a field outside of the pattern table 12 while the tracer 19 follows the outline of a pattern or drawing on the table.

Each of the torches has tubing 28 for supplying oxygen for a cutting jet, and there is separate tubing 29 and 30 for supplying fuel gas and oxygen, respectively, for preheating flames. Each torch is equipped with a pilot 31 and the gas for this pilot flame is supplied through tubing 32.

The tubing 28, 29, 30 and 32 connect with valves 34, 35, 36 and 37, respectively. These valves are located on the front bar 16. The ends of the tubing 28, 29, 30 and 32 connected with the valves are shown in Fig. 1, but in the drawing only the tubing 32 is shown in full, the other tubing being broken away close to the valves so as not to obstruct the view of the other parts. The end fitting of each tubing is indicated by the same reference character as the tubing. The valves 34—37 are held by a support 39 that is fastened to the front bar 16 by angles 40. The angles are connected to the front bar 16 by screws 41.

At the upper ends of the angles 40 there are bearings 42 for a valve actuator comprising a shaft 43 with cams 44—47 located above the valves 34—37, respectively. Each of the cams 44—47 has a hub through which it is pinned to the cam-shaft 43 by a pin 49. The cams 44—47 are so shaped and so related to each other that they open the valve 34—37 in a predetermined sequence.

The cam 47 opens the pilot control valve 37 first to cause the pilot flame, which receives a small gas flow even when valve 37 is closed, to increase in size for igniting gas that is to issue from the preheating jet orifices of the tip. The cam 45 opens the valve 35 next and supplies fuel gas, preferably acetylene, to the preheating jet orifices of the torch. The cam 46 then opens the valve 36 and permits oxygen to flow to the preheating flame jets. The opening of the acetylene valve 35 ahead of the oxygen valve 36 prevents flashbacks. The acetylene is ignited by the pilot flame before the oxygen valve 36 is opened.

The cam 44 opens the cutting oxygen valve 34 last, but the cams 45 and 46 are designed to hold the valves 35 and 36 open while the cutting oxygen valve is open. Since the pilot flame is not needed after the acetylene or fuel gas valve 35 has been opened and the acetylene ignited, the cam 47 is designed to permit the valve 37 to close soon after the fuel gas valve 35 is open.

The shaft 43 is substantially parallel to the front bar 16 and extends for considerable distance beyond the bearings 42 so that one end of the shaft 43 is near the tracer and the other end near the torches. Handles comprising knobs 50 are secured to the ends of the shaft 43, one or the other of these knobs being within convenient reach of an attendant who is standing near the torches or on the far side of the table 12 for guiding the tracer.

Fig. 3 shows the valve 36 with a valve rod 51 extending upward under a lever 52 that has a bifurcated end connected by a pivot pin 53 to a lug on the valve. The valve rod 51 is held upward by spring bias that maintains the valve 36 normally closed, and the cam 46 presses the right-hand end of the lever 52 downward to open the valve. The upstream side of the valve 36 is connected by tubing 55 with an oxygen supply line. Except for the shape of the cams, the structure of each of the valves 34—37 is similar to that shown in Fig. 3.

There is a check device associated with the shaft 43. This device includes a ratchet disk 57 pinned to the shaft 43 by a pin 49, and a pawl 58 held against the disk by a spring 59. The pawl 58 is supported from one of the angles 40 by a pivot bearing 60. A notch 61 on the periphery of the disk 57 is engaged by the pawl when the cam shaft is in a position that causes all of the valves to close, and this notch 61 has a steep side or shoulder that serves as a ratchet tooth and provides a positive check for preventing reverse rotation of the cam shaft. This insures the proper starting sequence. Other notches 62 correspond to the positions at which the valves are open for preheating and for cutting. The notches 62 permit backward rotation from cutting to preheating positions.

The invention has been described as applied to a cutting machine, but it will be evident that a similar combination in a welding machine is a mechanical equivalent.

I claim:

1. A cutting machine including in combination a carriage with wheels at both sides for stably supporting the carriage, a frame on the carriage for supporting a tracer and torch for universal movement in a plane with the tracer operating over a field between the paths followed by the wheels and the torch operating over a parallel field on the opposite side of one of said paths, valve means for controlling the supply of gas to the torch, and valve-actuator means extending transversely of the tracer field and including a handle accessible from the torch side of the tracer field, and another handle accessible from the other side of the tracer field.

2. Cutting apparatus including a pattern table, a wheeled carriage that runs on the opposite edges of the table as guides, two jointed arms with pivot connections by which the rearward ends of the arms are supported from the carriage, means holding the corresponding links of the jointed arms parallel with one another including a front bar pivotally connected with the forward ends of the links, a tracer connected with the bar in position to operate over the pattern table, one or more torches located near one end of the bar beyond the pattern table, four valves on the front bar for controlling the supply of pilot flame gas, cutting oxygen, preheating-flame oxygen, and fuel gas for the one or more torches on the bar, a separate operating lever connected to each valve, bearings supported by the front bar, a shaft rotatable in said bearings and extending across all four of the valves, four cams secured to the shaft, one in position to actuate each of the valves in accordance with a desired sequence, a disk secured to the shaft, a shoulder on the disk, a pawl cooperating with the shoulder to prevent reverse rotation of the shaft, and a handle at each end of the shaft, one near the tracer and the other near one of the torches.

3. In a cutting machine of the type having a frame comprising jointed arms with means for holding the corresponding links of said arms parallel with one another including a front bar that has universal movement in a plane and supports a tracer and torch, at longitudinally spaced points, for movement along similar courses, the combination with said front bar of separate valve means for controlling the supply of oxygen and fuel gas to the torch, a shaft supported by and extending lengthwise of the bar and rotatable to actuate the valve means in sequence, handles at opposite ends of the shaft, one in the region of the tracer and the other in the region of the torch, and means associated with said shaft for preventing reverse rotation of the shaft so that an operator is required to turn the shaft toward the right when standing on one side of the machine and toward the left when standing on the other side.

4. In a cutting machine, a plurality of valves for controlling the gas supply to a torch, including a fuel gas control valve, a preheating-oxygen control valve, and a cutting-oxygen control valve, valve-operating means including a rotary cam shaft, a separate cam on the shaft for actuating each valve, the cams being constructed and arranged to open the valves in a desired sequence and upon further rotation to cause the valves to close, and positive check means for preventing a reverse rotation of the cam shaft that would open the valves in a wrong sequence.

5. In cutting apparatus, a plurality of valves for controlling the supply of cutting oxygen, fuel gas, and preheating oxygen to one or more torches, separate cam means rotatable as a unit to cause said valves to open in a predetermined sequence and operable upon further rotation to cause said valves to close, and a positive check device for preventing reverse operation of the cam means.

6. Cutting apparatus including separate valves for controlling the supply of gas to a cutting torch, said valves including one through which gas is supplied to a cutting jet, another that controls the gas supply to a pilot flame, one valve for controlling a supply of fuel gas for preheating flames and another valve through which oxygen is supplied to the preheating flames, a cam shaft, four cams on said shaft, one in position to actuate each of the four valves, said cams being in such relation to each other that they cause the valves to open in a given sequence when the shaft is rotated in one direction, and to close when the shaft is rotated further in the same direction, a disk on the shaft, notches in the disk corresponding to the open positions of the respective valves, a pawl that engages the notches to hold the cam shaft in definite positions, and a shoulder on the disk for positively preventing reverse rotation of the disk after it has rotated far enough to cause the valves to close after having been opened in said given sequence, and means urging the pawl against the disk.

7. In a cutting machine, a plurality of valves for controlling the gas supply to a torch, including a preheating-oxygen control valve, and a cutting-oxygen control valve, valve-operating means including a cam shaft, cams on the shaft for operating the respective valves, said cams being constructed and arranged to operate the valves in a certain sequence when rotated in one direction and to close the valves when rotated further in the same direction, and a positive check device for preventing reverse rotation of the cam shaft after it has been rotated in said same direction far enough to close the valves.

8. In cutting apparatus, a plurality of valves for controlling the supply of cutting oxygen, fuel gas, and preheating oxygen to one or more torches, rotary cam means that cause said valves to open in a predetermined sequence, and then close when the cam means are rotated in one direction, and a positive check device for preventing reverse operation of the cam means after they have been rotated far enough to cause the valves to close.

JAMES D. McKIERNAN.